(12) United States Patent
Stadelbauer et al.

(10) Patent No.: US 9,267,617 B2
(45) Date of Patent: Feb. 23, 2016

(54) DRIVE UNIT FOR A MICRO VALVE COMPRISING A SHAPE MEMORY ALLOY, AND MICRO VALVE

(75) Inventors: Birgit Stadelbauer, Ludwigshafen (DE); Klaus-Guenther Beck, Oberkochen (DE)

(73) Assignee: Buerkert Werke GmbH, Ingelfingen (DE)

(*) Notice: Subject to any disclaimer, the term of this patent is extended or adjusted under 35 U.S.C. 154(b) by 966 days.

(21) Appl. No.: 13/190,577

(22) Filed: Jul. 26, 2011

(65) Prior Publication Data

US 2012/0025113 A1  Feb. 2, 2012

(30) Foreign Application Priority Data

Jul. 28, 2010 (DE) ..................... 20 2010 010 747 U (51) Int. Cl.
| | |
|---|---|
| *F16K 31/02* | (2006.01) |
| *F16K 31/66* | (2006.01) |
| *F16K 99/00* | (2006.01) |
| *F16K 31/00* | (2006.01) |

(52) U.S. Cl.
CPC ........... *F16K 99/0001* (2013.01); *F16K 31/002* (2013.01); *F16K 31/025* (2013.01); *F16K 99/0015* (2013.01); *F16K 99/0038* (2013.01); *F16K 99/0044* (2013.01); *C08L 2201/12* (2013.01)

(58) Field of Classification Search
USPC ..................... 251/6, 11; 137/79, 80
See application file for complete search history.

(56) References Cited

U.S. PATENT DOCUMENTS

| | | | | |
|---|---|---|---|---|
| 3,205,675 | A | * | 9/1965 | Matthies ......................... 62/202 |
| 3,344,672 | A | * | 10/1967 | Lingnau ........................... 251/11 |
| 3,613,732 | A | * | 10/1971 | Willson et al. ........... 137/625.44 |
| 3,664,582 | A | | 5/1972 | Jackson et al. |
| 4,171,087 | A | * | 10/1979 | Kunz ........................... 236/68 R |
| 4,325,217 | A | | 4/1982 | Golestaneh |

(Continued)

FOREIGN PATENT DOCUMENTS

| | | |
|---|---|---|
| CN | 1248676 A | 3/2000 |
| CN | 1804392 A | 7/2006 |

(Continued)

OTHER PUBLICATIONS

German Search Report dated Apr. 20, 2011.

(Continued)

*Primary Examiner* — Mary McManmon
*Assistant Examiner* — Jonathan Waddy
(74) *Attorney, Agent, or Firm* — Carlson, Gaskey & Olds, PC (57) ABSTRACT

A drive unit for a micro valve comprises a housing, a spring and at least one shape memory alloy element which is attached to the housing in a deflectable manner. The shape memory alloy element is loaded by the spring towards a deflected position and is movable in response to a temperature increase and the shape memory effect activated thereby, into a position which is at least less deflected against an increasing load by the spring. A normally closed micro valve includes a fluid housing, at least one valve seat, a sealing element opposite the valve seat, and a drive unit of the type mentioned above. The shape memory alloy element cooperates with the sealing element and exerts an operating force on the sealing element for closing and opening the valve seat with or against a compression spring force.

27 Claims, 4 Drawing Sheets

(56) References Cited

U.S. PATENT DOCUMENTS

| | | | | |
|---|---|---|---|---|
| 4,523,605 | A | * | 6/1985 | Ohkata ............................ 137/62 |
| 4,570,852 | A | * | 2/1986 | Ohkata ........................ 236/93 R |
| 4,836,496 | A | * | 6/1989 | Abujudom et al. ............. 251/11 |
| 4,848,388 | A | * | 7/1989 | Waldbusser ..................... 137/80 |
| 4,897,006 | A | * | 1/1990 | Blin ............................. 411/368 |
| 4,973,024 | A | * | 11/1990 | Homma .......................... 251/11 |
| 5,211,371 | A | * | 5/1993 | Coffee ............................ 251/11 |
| 5,325,880 | A | * | 7/1994 | Johnson et al. .................. 137/1 |
| 6,691,977 | B2 | * | 2/2004 | Knebel et al. .................. 251/11 |
| 8,540,206 | B2 | * | 9/2013 | Foshansky et al. ............. 251/11 |
| 2005/0178988 | A1 | | 8/2005 | Biehl et al. |
| 2007/0062021 | A1 | * | 3/2007 | Crockett ............... C22C 19/055 29/469.5 |
| 2009/0189100 | A1 | * | 7/2009 | Geburek et al. ................. 251/11 |
| 2010/0282332 | A1 | * | 11/2010 | Grandjean ............. F16K 17/38 137/80 |
| 2011/0315903 | A1 | | 12/2011 | Sohn |

FOREIGN PATENT DOCUMENTS

| | | | |
|---|---|---|---|
| CN | 101509556 | A | 8/2009 |
| DE | 19963499 | | 2/2001 |
| DE | 102008063534 | A1 * | 7/2010 |
| GB | 2056677 | A | 3/1981 |
| JP | H028571 | | 1/1990 |
| JP | 10141540 | | 5/1998 |
| JP | 2000230650 | A | 8/2000 |
| JP | 2004301144 | A | 10/2004 |
| JP | 2008144611 | A | 6/2008 |
| WO | 9319313 | | 9/1993 |
| WO | 9502143 | | 1/1995 |

OTHER PUBLICATIONS

William J. Buehler, William B. Cross, (1969) 55-Nitinol Unique Wire Alloy with a Memory. Wire Journal; Jun. 1969.

* cited by examiner

DRIVE UNIT FOR A MICRO VALVE COMPRISING A SHAPE MEMORY ALLOY, AND MICRO VALVE

RELATED APPLICATION

This application claims priority to German Application No. 20 2010 010 747.4, which was filed Jul. 28, 2011.

FIELD OF THE INVENTION

The invention relates to a drive unit for a micro valve comprising a shape memory alloy element as well as to a micro valve.

BACKGROUND

Shape memory alloy elements are distinguished in that they may be used as actuators with high energy density.

Valves are known in which one or more actuating elements cooperate with shape memory alloy elements in the form of a wire, as is described in DE 102 33 601, for example.

Foils made from shape memory alloys are also known. In this case, only a very small travel for controlling the stroke of a valve is available in valves, and only low pressures can be controlled.

Moreover, known valves based on the shape memory alloy principle for the actuator are NO designs (i.e. "normally open") in many cases. As a rule, industrial applications require NC valves (i.e. "normally closed") which are closed in the state of rest and will not open until they are acted upon by an electrical current.

SUMMARY

A drive unit for a micro valve and a micro valve comprising a shape memory alloy element are configured to provide a larger available stroke.

The drive unit for a micro valve comprises a housing, a spring, and a shape memory alloy element. The shape memory alloy element is attached to the housing in a deflectable manner and is loaded by the spring towards a deflected position. In the event of a temperature increase, the shape memory effect becomes operative: the shape memory alloy element is moved into a less deflected position along with an increasing spring load.

The deflection of the shape memory alloy element by the spring results from the fact that the shape memory alloy element is pushed apart by a spring force, for instance. If the temperature increases, the latter contracts to assume its initial shape and hence assumes a position which is less deflected against an increasing spring force. It is also possible, however, that the shape memory alloy element is first compressed by the spring and then expands with an increase in temperature, hence reaching a position which is less deflected against an increasing spring force. The shape "remembered" by the shape memory alloy element in the event of a temperature increase is imparted to said element in a known manner by it being acted upon by force and temperature.

In one embodiment, the shape memory alloy element comprises at least one pair of foils stacked upon each other and which are connected to each other at their outer circumference at least in sections, in particular are welded, and are pushed apart by the spring or compressed. Especially in the case of applying the drive unit in valve technology, using a pair of stacked foils has the advantage that a larger valve stroke is made available. Therefore, more than two foils may be stacked upon each other, of course.

The individual foils comprise a central passage for the spring or a transmission element cooperating with the spring. Depending on the desired size and force conditions, it is also possible to select a spring having a larger diameter, and the shape memory alloy element may then be placed within the spring.

The spring is preferably a compression spring supported by the housing and engaging the foil which is farthest from the support. The shape memory alloy element is pushed apart by the spring by a travel which is defined, for instance, by a stop element. Since the shape memory alloy element is affixed on the same housing side, the height of the foil stack is fully exploited. When acted upon by temperature, the shape memory alloy element reassumes its original height against the spring force.

Basically, the spring may be an element with elastic properties, which is manufactured from spring steel or an elastomeric material.

In another embodiment, the compression spring and the shape memory alloy element are supported by opposite housing sides. In this case, the compression spring engages the foil adjacent to it, and the foil stack is compressed along with a reduction of its original height. When acted upon by temperature, the foil stack expands and returns to the initial position with larger height, the compression spring being loaded further.

One example embodiment comprises at least two pairs of foils stacked upon each other. Neighboring foils of two pairs are connected to each other on the circumference of the central passage for the spring or the transmission element cooperating with the spring. This gives the foil stack a spring-like geometry - it may be compressed or pulled apart.

Depending on whether the shape memory alloy element and the spring are supported by the same housing side or opposite housing sides, these two elements will engage the transmission element on the same side or opposite sides. In case that the shape memory alloy element and the transmission element are firmly connected to each other, e.g. are welded, the transmission element follows the movement corresponding to the actuator motion by the shape memory alloy element. If this drive unit is used in a valve, there is the advantage that the valve opens automatically even in the absence of any fluid pressure.

The firm connection between the shape memory alloy element and the transmission element may be omitted if the shape memory alloy element and the spring engage the transmission element on opposite sides. In this case, the transmission element rests on the shape memory alloy element and automatically follows any movement of the shape memory alloy element.

There is a large design freedom in terms of the geometric design of the individual foils for the foil stack forming the shape memory alloy element. It may be formed in particular to be elliptical, circular, or triangular for example. Other geometries are also conceivable, however. The foils are structured according to known methods, for instance by laser cutting or a wet chemical etching process.

It is also possible to use several shape memory elements in a drive unit. Instead of the shape memory alloy element being affixed across a large area on a side of the drive unit housing, two or more shape memory alloy elements may be inserted in the drive unit housing such that they are rotated by 90°, so that the foils have their outer circumference resting against the drive unit housing. The central passage will then be formed between the two or more centrically arranged shape memory alloy elements.

According to an embodiment of the invention, the foils are heated by an electric current flowing in their interior. NiTi, CuZn, or FeNiAl alloys are typical materials for shape memory alloys. The transition temperatures are in the range from 100 to 300° C. However, there are shape memory alloys where the transition temperature ranges from only 40 to 70° C. The exposure to temperature may also be achieved without any direct electrical contacting of the shape memory alloy element, for example by a heating element or transfer by contact with a fluid. A further possibility of temperature application of the shape memory alloy element may be achieved in that the spring is electrically contacted and is in electrically conductive connection to the shape memory alloy element. Here, the shape memory alloy element may be designed such that an external foil has no central passage and the spring rests on this foil.

Preferably, active or passive cooling elements are used for cooling the shape memory alloy element. In doing so, the switching times when using the drive unit in micro valves may be considerably reduced. Peltier elements are also known in micro designs.

The drive unit is particularly suited for use as an actuator in micro valves, in particular in normally closed micro valves. In one embodiment, a micro valve including a drive unit comprises a fluid housing with at least one valve seat and a sealing element opposite the valve seat. The sealing element cooperates with the shape memory element, exerting an operating force on the sealing element for opening the valve against the compression spring force.

The sealing element can be formed as a membrane which is sandwiched between the fluid housing and the drive unit housing. The sealing element, however, may also be arranged on the transmission element on the side adjoining the valve seat.

BRIEF DESCRIPTION OF THE DRAWINGS

Further features and advantages of the invention will be apparent from the following description with reference to the attached drawings, in which.

DETAILED DESCRIPTION

Figure 1A:
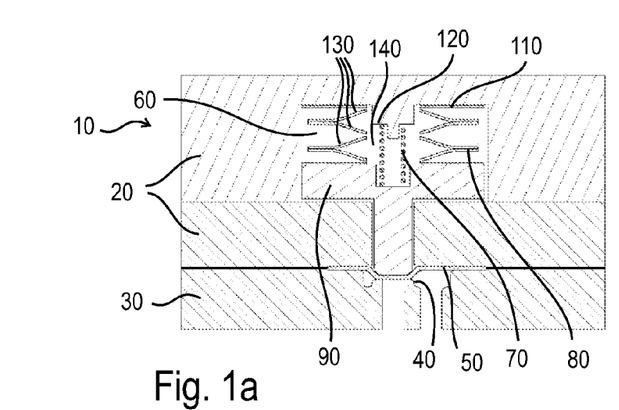
FIG. 1a is a sectional drawing taken through a micro valve in a "closed" position.

FIG. 1a illustrates a cross-section of a micro valve 10 comprising a drive unit housing 20 and a fluid housing 30 with a valve seat 40. The drive unit housing 20 may be constructed in two pieces. A membrane 50 is arranged between the drive unit housing 20 and the fluid housing 30. The drive unit housing 20 comprises a chamber 60 which is open towards the fluid housing 30 and in which a spring 70, a shape memory alloy element 80 and a transmission element 90 are arranged. The shape memory alloy element 80 has one side affixed to a support 110 of the housing 20 and its opposite side affixed to the transmission element 90. On the same housing side, the spring 70 has its one end resting on a support 120 and its second end resting on the transmission element 90. Likewise, the spring 70 and the shape memory alloy element 80 are affixed to the same side of the transmission element 90.

The shape memory alloy element 80 comprises at least one pair of foils 130 stacked upon each other, which are connected to each other at their outer circumference at least in sections. Depending on the shape of the foils 130, two triangular foils 130 may be connected to each other locally at their three corners, for instance, in particular by welding. Circular foils may be connected to each other along their entire outer circumference. In this way, the external shape of the shape memory alloy element 80 resembles a stack of disc springs. Due to the fact that several foils 130 are stacked upon each other, a travel exists which is larger than if only a single foil were used. This travel can be exploited as a stroke when used in valves.

A central passage 140 for receiving the spring 70 is arranged in the shape memory alloy element 80. Depending on the force and the travel which are to be provided by the shape memory alloy element 80, the spring 70 and the shape memory alloy element 80 may also be designed such that the spring 70 has a larger inner diameter than the shape memory alloy element 80; then, the spring 70 may accommodate the shape memory alloy element 80 within its interior.

The spring 70 is compressed and pushes the transmission element 90 against the membrane 50 and the valve seat 40, thereby closing the latter. At the same time, the spring 70 pushes the shape memory alloy element 80 apart towards a deflected position. Here, the spring 70 is a compression spring and, in the shape memory alloy element 80, engages that foil 130 which is farthest from the support 120. In this way, the entire height of the shape memory alloy element 80 is made use of.

As shown in FIG. 1a, it is also possible to use several pairs of foils 130 in the shape memory alloy element 80 which are stacked upon each other. Neighboring foils of two pairs of foils are respectively connected to each other on the circumference of the central passage 140. In this way, the shape memory alloy element 80 takes on a spring-like geometry. The foils 130 may be pulled apart or compressed in an accordion-like fashion.

In one embodiment, the shape memory alloy element 80 and the transmission element 90 are firmly connected to each other. This is why the transmission element 90 follows the movements of the actuator. This drive unit may also be used in those valves where only a small fluid pressure is available. After activating the shape memory alloy element 80, the valve opens automatically without assistance from the fluid. In case of higher fluid pressures, however, a connection between the shape memory alloy element 80 and the transmission element 90 may be omitted.

The foils 130, which are stacked upon each other to form the shape memory alloy element 80, comprise electric contacts. When acted upon by an electric current, the foils 130 are heated within their bodies, whereby the "memory" of the shape memory alloy element 80 is activated: the latter assumes the shape imposed on it.

Figure 1B:
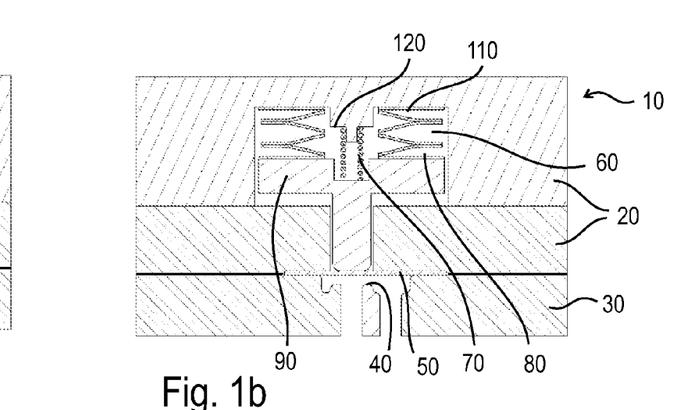
FIG. 1b is a sectional drawing according to FIG. 1a in an "open" position.

FIG. 1b shows a cross-section of the micro valve 10 corresponding to FIG. 1a but in the opened condition. Here, the shape memory alloy element 80 is illustrated in a position which is deflected to a somewhat lesser extent, a position which will be assumed by it in case of a temperature increase/current flow. The shape memory alloy element 80 contracts, along with the spring 70 being loaded to a further extent. As a result, the transmission element 90 and the membrane 50 open the valve seat 40.

In order to shorten the switching times of the micro valve 10, an active or passive cooling element, in particular a micro-type Peltier element is employed in a favorable embodiment.

Figure 2A:
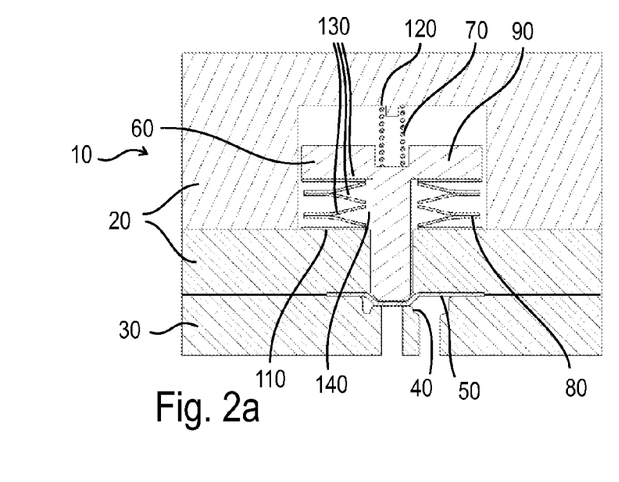
FIG. 2a is a sectional drawing taken through a second embodiment of a micro valve in the "closed" position.

FIG. 2a shows a cross-section of a further embodiment of the micro valve 10 in the closed condition. This micro valve comprises all the components of the valve illustrated in FIG. 1a, but with the parts arranged differently. The shape memory alloy element 80 is supported by the support 110 on a side of the drive unit housing 20, the spring 70 is supported by the support 120 arranged on the opposite side of the drive unit housing 20. The spring 70 and the shape memory alloy element 80 have their other end resting on opposite sides of the transmission element 90. The spring 70 engages the foil 130 which is next to the support 120 and compresses the shape memory alloy element 80 to assume a deflected shape. This arrangement has the advantage that the transmission element 90 rests on the shape memory alloy element 80; this is why it is not necessarily required (regardless of the pressure conditions of the fluid) that these two components are firmly connected to each other, since the transmission element 90 follows the motion of the actuator.

Figure 2B:
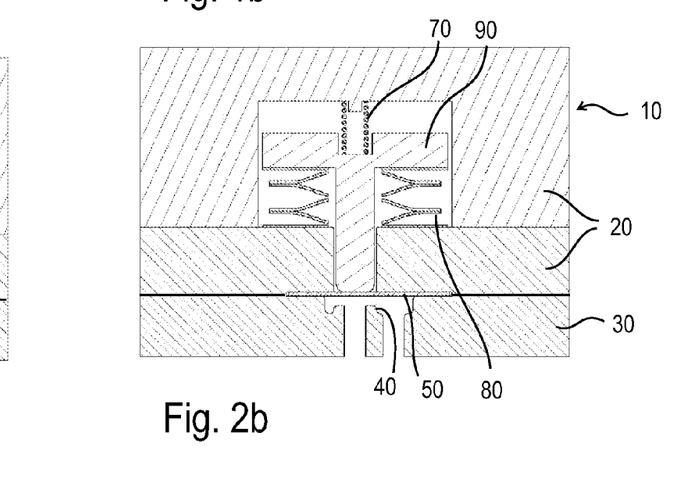
FIG. 2b is a sectional drawing taken through the micro valve according to FIG. 2a in the "open" position.

FIG. 2b illustrates a cross-section of the micro valve 10 from FIG. 2a in the open condition. The shape memory alloy element 80 is shown here in its less deflected position, which it assumes when acted upon by an electric current. At an elevated temperature, the shape memory alloy element 80 expands by "memory" to the shape imparted to it, the spring 70 being loaded to a further extent. As a result, the transmission element 90 and the membrane 50 open the valve seat 40.

Figures 3A, 3B:
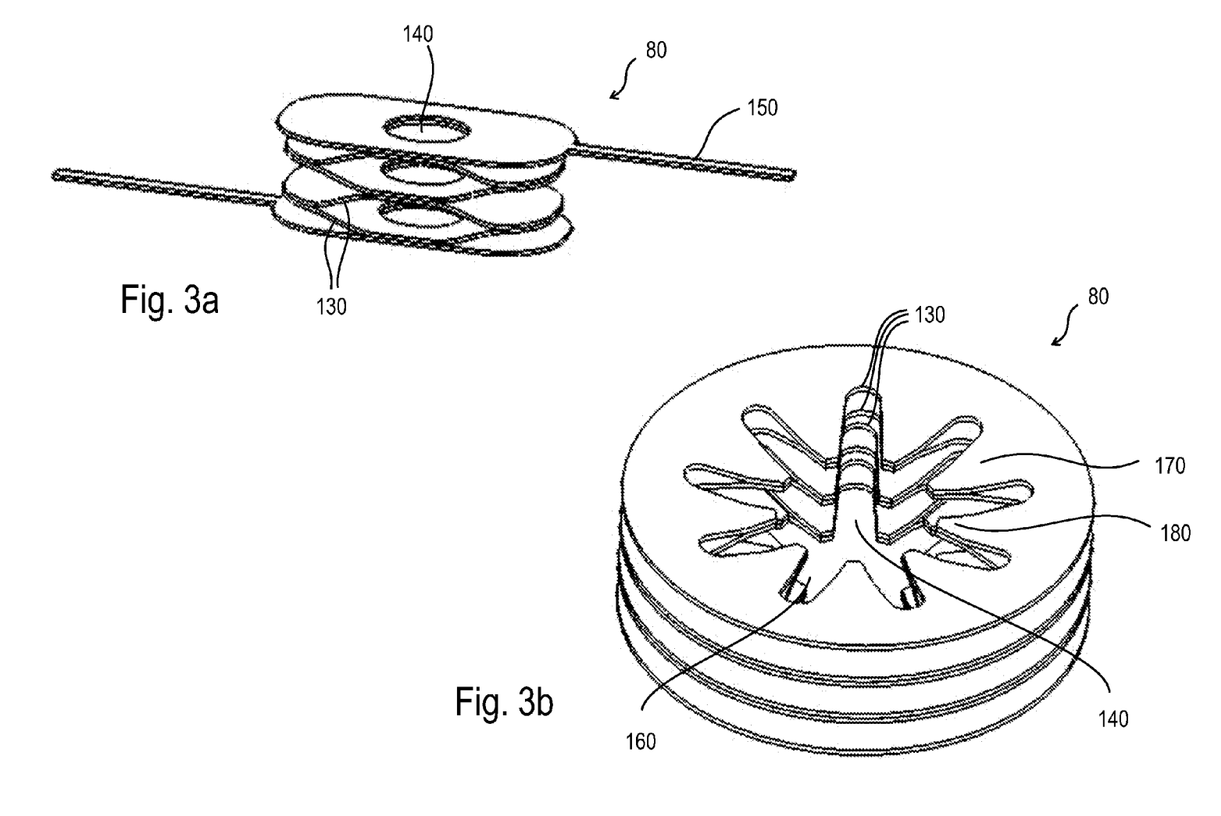
FIG. 3a is a top view of a shape memory alloy element according to the invention.
FIG. 3b is a top view of a further embodiment of a shape memory alloy element.
Figure 4:
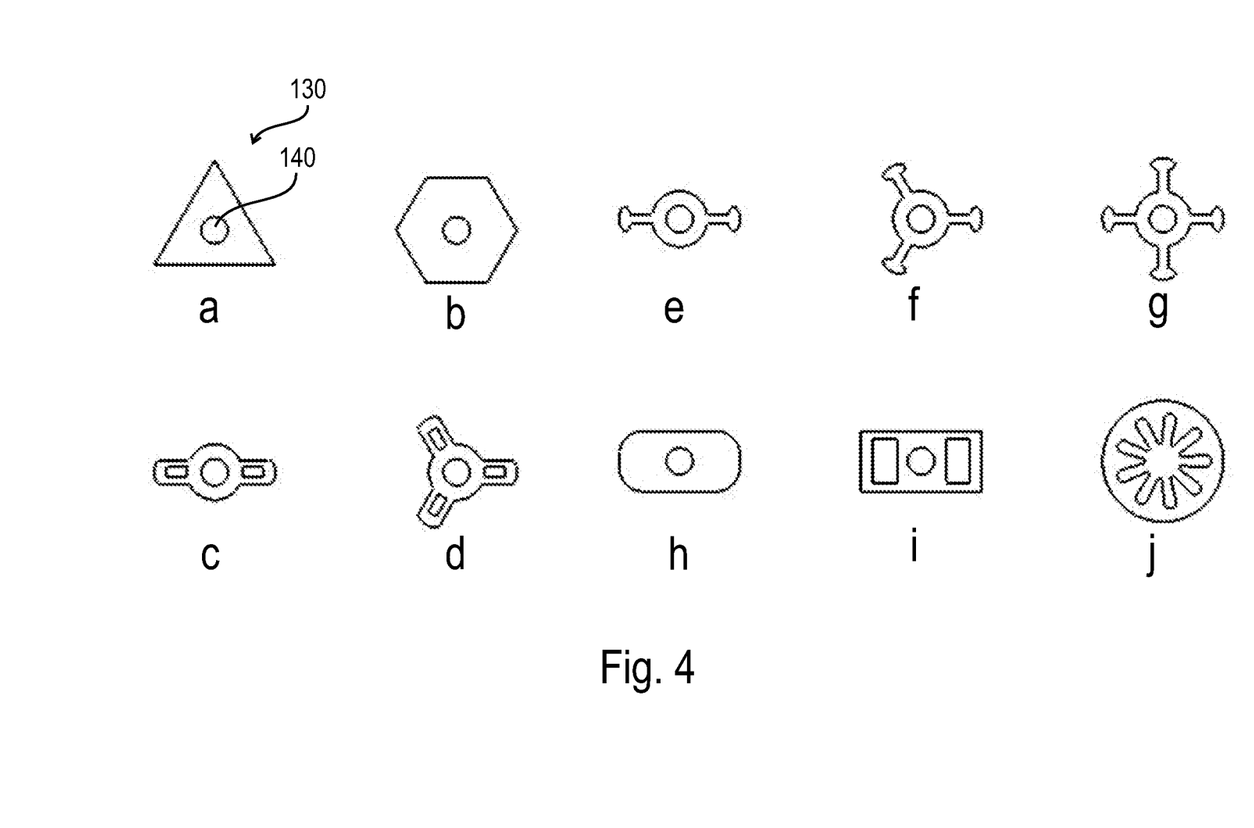
FIG. 4a is a top view of one embodiment of a foil for assembling shape memory alloy elements.
FIG. 4b is a top view of another embodiment of a foil for assembling shape memory alloy elements.
FIG. 4c is a top view of another embodiment of a foil for assembling shape memory alloy elements.
FIG. 4d is a top view of another embodiment of a foil for assembling shape memory alloy elements.
FIG. 4e is a top view of another embodiment of a foil for assembling shape memory alloy elements.
FIG. 4f is a top view of another embodiment of a foil for assembling shape memory alloy elements.
FIG. 4g is a top view of another embodiment of a foil for assembling shape memory alloy elements.
FIG. 4h is a top view of another embodiment of a foil for assembling shape memory alloy elements.
FIG. 4i is a top view of another embodiment of a foil for assembling shape memory alloy elements.
FIG. 4j is a top view of another embodiment of a foil for assembling shape memory alloy elements.

FIG. 3a shows a shape memory alloy element 80 which is assembled from foils 130 stacked upon each other and comprises the central passage 140. Electrical contacts 150 are attached to the external foils 130 on opposite sides. The position of the electrical contacts 150, however, can be selected and adapted corresponding to the installation situation in the valve 10. The foils 130 have an elliptical shape. In each of the pairs of foils, the foils 130 are connected to each other at their outer circumference at least in sections. Neighboring pairs of foils stacked upon each other are connected to each other at the circumference of the central passage 140; in particular, they are welded. In the embodiment according to FIG. 3a, the central passage 140 is formed in a circular shape.

The central passage 140 may also have another geometry, as is shown in FIG. 3b, for instance.

In FIG. 3b, the shape memory alloy element 80 is constructed from circular foils 130. The central passage 140 is likewise configured so as to be circular, but comprises additional radial recesses 160 extending from the center towards the outside. Here, essentially triangular foil sections 170 remain which each have a corner 180 pointing towards the central passage 140. Neighboring pairs of foils are connected to each other at these corners 180.

FIGS. 4a to 4j exemplarily show various embodiments of the foils 130 with the central passage 140. The wide variety of design possibilities is visible here.

Figure 5:
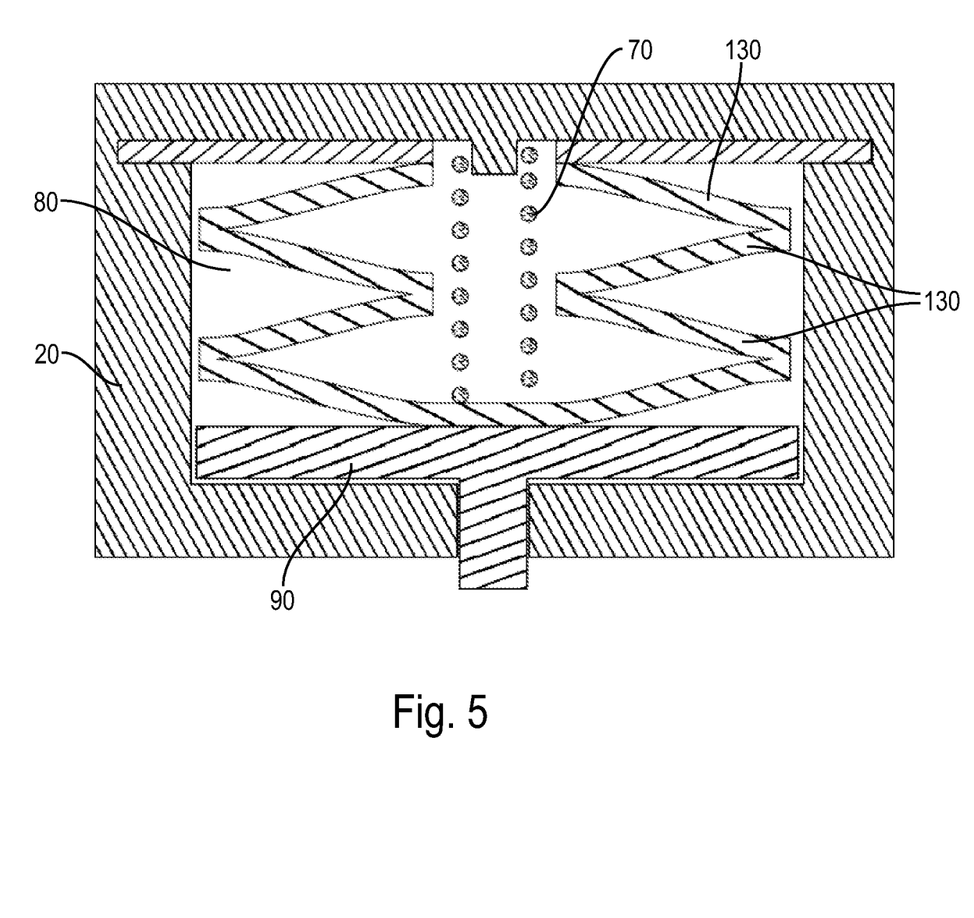
FIG. 5 shows an alternative embodiment of the drive unit of the micro valve.

FIG. 5 shows an implementation of the drive unit of the micro valve, as it is known in its basic construction from FIGS. 1a and 1b. For the components which are known from the embodiments of FIGS. 1a and 1b, the same reference numerals are used and reference is made to the above explanations.

Unlike the embodiment of FIGS. 1a and 1b, the shape memory alloy element 80 in the configuration of FIG. 5 is realized to be closed on the side facing the transmission element 90. Thus, the spring 70 is supported by the inner side of the lowermost foil 130 which in turn rests against the transmission element 90.

In one example, the external dimensions of the micro valve are approximately 5 mm×5 mm×5 mm.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A drive unit for a micro valve comprising:
   a housing free from fluid ports;
   a spring;
   at least one shape memory alloy element which is attached to the housing in a deflectable manner, is loaded by the spring towards a deflected position, and is movable in response to a temperature increase, and the shape memory effect activated thereby, into a position which is at least less deflected against an increasing load by the spring;
   wherein the at least one shape memory alloy element comprises at least one pair of foils stacked upon each other which are connected to each other at an outer perimeter at least in sections and are biased by the spring into the deflected position, and wherein the foils include a central passage through which the spring extends; and
   wherein the at least one shape memory alloy element and the spring engage the same side of a transmission element, and wherein the transmission element is formed as one-piece.

2. The drive unit according to claim 1, in which the spring is a compression spring resting against a support on the housing and engaging the transmission element.

3. The drive unit according to claim 1, in which at least two pairs of foils are stacked upon each other and neighboring foils of the two pairs are connected to each other on a circumference of the central passage for the spring.

4. The drive unit according to claim 1, wherein the shape memory alloy element is firmly connected to the transmission element.

5. The drive unit according to claim 1, wherein the foils have an elliptical, circular or triangular shape.

6. The drive unit according to claim 1, wherein the foils can be heated by an electric current flowing in a foil interior.

7. The drive unit according to claim 1, wherein the foils can be cooled by an active or passive cooling element.

8. The drive unit according to claim 1, wherein the at least one shape memory alloy element is concentric with the spring, and wherein the at least one shape memory alloy element is positioned radially outwardly of the spring.

9. A drive unit for a micro valve comprising:
a housing;
a spring;
at least one shape memory alloy element which is attached to the housing in a deflectable manner, is loaded by the spring towards a deflected position, and is movable in response to a temperature increase, and the shape memory effect activated thereby, into a position which is at least less deflected against an increasing load by the spring;
wherein the at least one shape memory alloy element comprises at least one pair of foils stacked upon each other which are connected to each other at an outer perimeter at least in sections and are biased by the spring into the deflected position, and wherein the foils include a central passage through which the spring extends;
wherein the at least one shape memory alloy element and the spring engage the same side of a transmission element, and wherein the transmission element is formed as one-piece; and
wherein the spring is a compression spring resting against a support on the housing and engaging the foil which is farthest from the support.

10. A micro valve that is a normally closed micro valve, comprising:
a fluid housing;
at least one valve seat;
a sealing element directly interacting with the at least one valve seat to seal fluid within the fluid housing;
a drive unit comprising
a drive unit housing separated from the fluid housing by the sealing element which prevents fluid from entering the drive unit housing, wherein the drive unit housing is free from fluid ports,
a spring,
at least one shape memory alloy element which is attached to the drive unit housing in a deflectable manner, is loaded by the spring towards a deflected position, and is movable in response to a temperature increase, and the shape memory effect activated thereby, into a position which is at least less deflected against an increasing load by the spring,
wherein the at least one shape memory alloy element comprises at least one pair of foils stacked upon each other which are connected to each other at an outer perimeter at least in sections and are biased by the spring into the deflected position, and wherein the foils include a central passage through which the spring extends, and
wherein the at least one shape memory alloy element and the spring engage the same side of a transmission element and wherein the transmission element is formed as one-piece.

11. The micro valve according to claim 10, wherein the sealing element comprises a membrane arranged directly between the valve seat and the transmission element to prevent fluid from entering the drive unit housing.

12. The micro valve according to claim 10, wherein the external dimensions of the micro valve amount to approximately 5 mm x 5 mm x 5 mm.

13. The micro valve according to claim 10, wherein the one-piece transmission element extends from a first end to a second end, the first end comprising a shaft portion with a distal end that selectively engages the at least one valve seat and the second end comprising an enlarged flange portion that abuts directly against the at least one shape memory alloy element.

14. The micro valve according to claim 13, wherein the enlarged flange portion includes a recess that receives one end of the spring.

15. The micro valve according to claim 13, wherein the drive unit housing includes an inwardly protruding support that receives an end of the spring.

16. The micro valve according to claim 13, wherein the enlarged flange portion includes a recess that receives one end of the spring, and wherein the drive unit housing includes an inwardly protruding support that receives an opposite end of the spring.

17. A micro valve that is a normally closed micro valve. comprising:
a fluid housing;
at least one valve seat;
a sealing element directly interacting with the at east one valve seat to seal fluid within the fluid housing;
a drive unit comprising a drive unit housing separated from the fluid housing by the sealing element which prevents fluid from entering the drive unit housing, a spring, and at least one shape memory alloy element which is attached to the drive unit housing in a deflectable manner, is loaded by the spring towards a deflected position, and is movable in response to a temperature increase, and the shape memory effect activated thereby, into a position which is at least less deflected against an increasing load by the spring;
wherein the shape memory alloy element cooperates with the sealing element and exerts an operating force on the sealing element for closing and opening the valve seat with or against a compression spring force;
wherein the at least one shape memory alloy element comprises at least one pair of foils stacked upon each other which are connected to each other at an outer perimeter at least in sections and are biased by the spring into the deflected position, and wherein the foils include a central passage through which the spring or a transmission element cooperating with the spring extends, and wherein the transmission element is formed as one-piece; and
wherein the at least one shape memory alloy element is concentric with the spring, and wherein the at least one shape memory alloy element is positioned radially outwardly of the spring.

18. A drive unit for a micro valve comprising:
a housing;
a spring;
at least one shape memory alloy element which is attached to the housing in a deflectable manner, is loaded by the spring towards a deflected position, and is movable in response to a temperature increase, and the shape memory effect activated thereby, into a position which is at least less deflected against an increasing load by the spring;
wherein the at least one shape memory alloy element comprises at least one pair of foils stacked upon each other which are connected to each other at an outer perimeter at least in sections and are biased by the spring into the deflected position, and wherein the foils include a central passage through which the spring extends;

wherein the at least one shape memory alloy element and the spring engage the same side of a transmission element, and wherein the transmission element is formed as one-piece; and wherein the one-piece transmission element extends from a first end to a second end, the first end comprising a shaft portion with a distal end configured to engage a valve seat and the second end comprising an enlarged flange portion that abuts directly against the at least one shape memory alloy element.

19. The drive unit according to claim 18, wherein the enlarged flange portion includes a recess that receives one end of the spring.

20. The drive unit according to claim 18, wherein the housing includes an inwardly protruding support that receives an end of the spring.

21. The drive unit according to claim 18, wherein the enlarged flange portion includes a recess that receives one end of the spring and wherein the housing includes an inwardly protruding support that receives an opposite end of the spring.

22. A drive unit for a micro valve comprising:
a drive unit housing free from fluid ports;
a spring;
at least one shape memory alloy element which is attached to the housing in a deflectable manner, is loaded by the spring towards a deflected position, and is movable in response to a temperature increase, and the shape memory effect activated thereby, into a position which is at least less deflected against an increasing load by the spring;

wherein the at least one shape memory alloy element comprises at least one pair of foils stacked upon each other which are connected to each other at an outer perimeter at least in sections and are biased by the spring into the deflected position, and wherein the foils include a central passage through which the spring or a transmission element cooperating with the spring extends, and wherein the transmission element is formed as one-piece; and wherein the at least one shape memory alloy element is deflected by an electric current.

23. The drive unit according to claim 22, including a sealing element to prevent fluid from entering the drive unit housing.

24. The drive unit according to claim 23, wherein the sealing element is configured to separate the drive unit housing from a fluid housing adapted to be attached to the drive unit housing.

25. The drive unit according to claim 24, wherein the sealing element comprises a membrane arranged between the transmission element and a valve seat of the fluid housing to prevent fluid from the fluid housing from entering the drive unit housing.

26. The drive unit according to claim 22, wherein the shape memory alloy element and the spring engage the same side of the transmission element.

27. The drive unit according to claim 22, wherein the shape memory alloy element and the spring engage opposite sides of the transmission element.

* * * * *

UNITED STATES PATENT AND TRADEMARK OFFICE
CERTIFICATE OF CORRECTION

PATENT NO.        : 9,267,617 B2                                          Page 1 of 1
APPLICATION NO.   : 13/190577
DATED             : February 23, 2016
INVENTOR(S)       : Birgit Stadelbauer It is certified that error appears in the above-identified patent and that said Letters Patent is hereby corrected as shown below:

IN THE CLAIMS:

Claim 17, column 8, line 22: after "valve" remove "." and replace with --,--

Signed and Sealed this
Seventeenth Day of May, 2016

Michelle K. Lee
*Director of the United States Patent and Trademark Office*